(12) United States Patent
Schalla et al.

(10) Patent No.: US 11,214,373 B2
(45) Date of Patent: Jan. 4, 2022

(54) GALLEY AND METHOD OF ASSEMBLING A GALLEY

(71) Applicant: THE BOEING COMPANY, Chicago, IL (US)

(72) Inventors: James P. Schalla, Edmonds, WA (US); Mark Edward King, Arlington, WA (US); Michael J. Burgess, Seattle, WA (US); Lyndsey Jo Penfield, Everett, WA (US); James Paul Mehlos, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 786 days.

(21) Appl. No.: 16/004,879

(22) Filed: Jun. 11, 2018

(65) Prior Publication Data
US 2019/0375508 A1 Dec. 12, 2019

(51) Int. Cl.
| | |
|---|---|
| *B64D 11/04* | (2006.01) |
| *B64D 13/08* | (2006.01) |
| *B64C 1/40* | (2006.01) |
| *F25D 23/06* | (2006.01) |
| *B64D 13/06* | (2006.01) |

(52) U.S. Cl.
CPC .............. *B64D 11/04* (2013.01); *B64D 13/08* (2013.01); *B64C 1/40* (2013.01); *B64D 2013/0629* (2013.01); *F25D 23/063* (2013.01); *F25D 2201/126* (2013.01)

(58) Field of Classification Search
CPC ............ B64C 1/40; B64D 11/04; B64D 13/08; B64D 2013/0629
See application file for complete search history.

(56) References Cited

U.S. PATENT DOCUMENTS

| | | | |
|---|---|---|---|
| 4,689,930 A * | 9/1987 | Menchetti | E04B 2/7409 52/275 |
| 8,322,654 B2 | 12/2012 | Gomes et al. | |
| 9,085,351 B2 | 7/2015 | Burd | |
| 9,303,912 B1 | 4/2016 | Schalla et al. | |
| 9,868,530 B2 * | 1/2018 | Burd | B32B 5/245 |
| 10,556,686 B2 * | 2/2020 | Heidtmann | B64D 11/02 |
| 10,875,649 B2 * | 12/2020 | Brown | F16B 5/0088 |
| 2013/0248649 A1 * | 9/2013 | Burd | B32B 5/18 244/1 N |
| 2018/0016014 A1 * | 1/2018 | Burd | F25D 17/045 |
| 2018/0118347 A1 * | 5/2018 | Heidtmann | E04B 1/19 |

* cited by examiner

*Primary Examiner* — Philip J Bonzell
(74) *Attorney, Agent, or Firm* — The Small Patent Law Group LLC; Jay J. Hoette

(57) ABSTRACT

A galley for an aircraft includes a frame having metal structural members having interior surfaces and panels coupled to and supported by the frame. Each panel has a core and a facesheet having an inner surface. The frame and the panels define a cart compartment configured to receive a galley cart. The interior surfaces of the metal structural members are interior of the inner surface of the corresponding facesheet. The galley includes a cooling system having a supply duct and a return duct along one or more of the panels in flow communication with the cart compartment configured to supply cooled airflow from a heat exchanger. The galley includes insulating panels located in the cart compartment covering the interior surfaces of the corresponding metal structural members.

25 Claims, 9 Drawing Sheets

GALLEY AND METHOD OF ASSEMBLING A GALLEY

BACKGROUND

The present disclosure relates generally to thermal insulation for galleys and methods of thermally insulating galleys.

Aircraft typically include multiple galleys to store food and beverages on the aircraft. The food and beverages are typically stored in galley carts, which are transported to the aircraft and stored in refrigerated galley cart compartments in the galleys. In some known galleys, the refrigerated compartments include doors to close the galley cart compartments for air-over-cart cooling of the galley carts. However, conventional galleys are inefficient. For example, the galleys have significant air leakage occurs around the door into the galley space of the aircraft. Additionally, the while the panels used to form the galley provide some thermal insulation, the panels are designed to be lightweight and robust. Additionally, the frame of the galley includes multiple metal structural members that are exposed in the cart compartment, thus defining thermal bridges between the cooled cart compartment and the exterior of the galley.

Conventional galleys use heat exchangers to provide cooling airflow to the cart compartment through supply and return ducts. The heat exchangers are sized to achieve the desired cooling needed in the cart compartment. However, because the cart compartments are thermally inefficient, the heat exchangers are larger than would be needed if the cart compartment were more thermally efficient. The oversized heat exchangers add cost and weight to the aircraft. The oversized heat exchangers use more power to operate, requiring a greater electrical demand on the engines used to supply the power and thus consuming more fuel. The oversized heat exchangers generate and exhaust excess heat, resulting in higher cabin temperatures and putting a larger demand on the cabin cooling system to cool the cabin.

SUMMARY

In accordance with one embodiment, a galley for an aircraft includes a frame having metal structural members having interior surfaces and panels coupled to and supported by the frame. Each panel has a core and a facesheet having an inner surface. The frame and the panels define a cart compartment configured to receive a galley cart. The interior surfaces of the metal structural members are interior of the inner surface of the corresponding facesheet. The galley includes a cooling system having a supply duct and a return duct along one or more of the panels in flow communication with the cart compartment configured to supply cooled airflow from a heat exchanger. The galley includes insulating panels located in the cart compartment covering the interior surfaces of the corresponding metal structural members.

In accordance with one embodiment, a galley for an aircraft including a frame having metal structural members having interior surfaces and panels coupled to and supported by the frame. Each panel has a core and a facesheet having an inner surface. The frame and the panels define a cart compartment configured to receive a galley cart and configured to be cooled by a cooling system. The interior surfaces of the metal structural members are interior of the inner surface of the corresponding facesheet. The galley includes insulating panels located in the cart compartment covering a majority of the interior surfaces of the metal structural members.

In accordance with one embodiment, a method of assembling a galley including a frame having metal structural members having interior surfaces includes coupling panels to the frame each having a core and a facesheet including an inner surface to define a cart compartment configured to receive a galley cart, wherein the interior surface of the metal structural members are interior of the inner surface of the corresponding facesheet. The method includes positioning insulating panels in the cart compartment to cover the interior surfaces of the corresponding metal structural members.

DETAILED DESCRIPTION

The embodiments described herein provide thermal insulation for a cart compartment of a galley that insulates structural parts of the galley. The thermal insulation insulates the cart compartment more effectively compared to conventional galleys. Described herein are various embodiments of insulating panels that are removably coupled to the interior walls of the cart compartment to cover metal structural members of the galley that form thermal bridges when uninsulated. Various embodiments provide insulating panels that cover corner extrusions, door hinges, cart dividers, saddle brackets, ducts, or other metal structural members exposed at the interior of the cart compartment. Various embodiments provide insulating panels that cover fasteners used to secure metal structural components and/or wall panels of the galley.

The following detailed description of certain embodiments will be better understood when read in conjunction with the appended drawings. It should be understood that the various embodiments are not limited to the arrangements and instrumentality shown in the drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
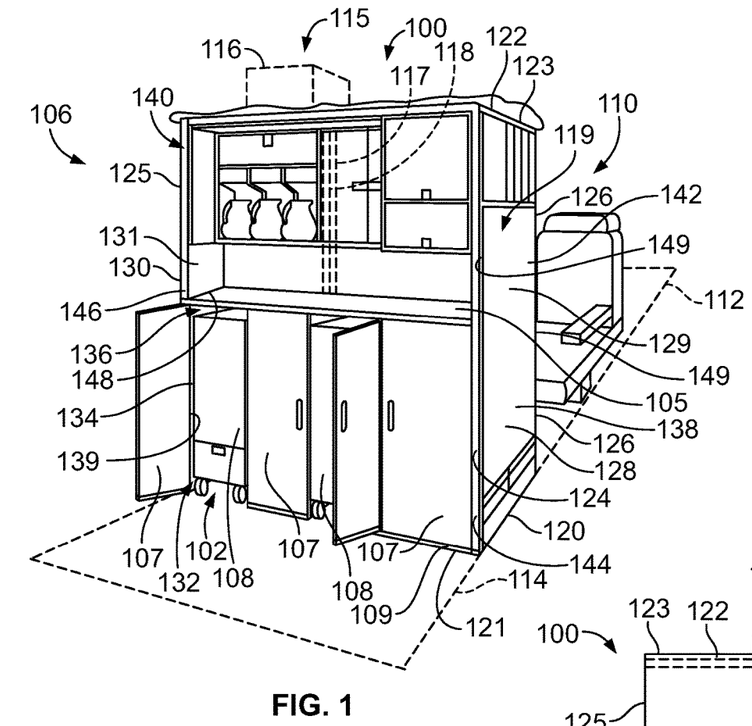
FIG. 1 is a schematic illustration of an exemplary galley for an aircraft in accordance with an exemplary embodiment.
Figure 2:
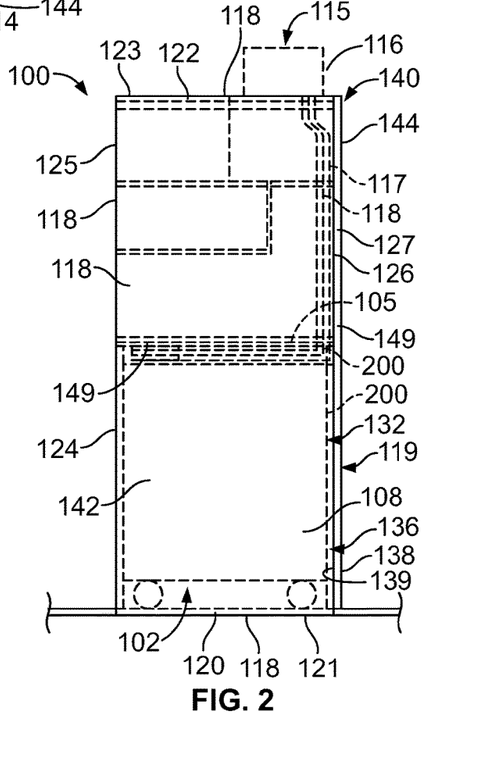
FIG. 2 is a side view of the galley in accordance with an exemplary embodiment.

FIG. 1 is a schematic illustration of an exemplary galley 100 for an aircraft 106 or other vehicle. FIG. 2 is a side view of the galley 100 in accordance with an exemplary embodiment. The galley 100 is used to cool galley carts 108 positioned in cart compartments 102 of the galley 100. In an exemplary embodiment, the cart compartments 102 are thermally insulated for efficient cooling of the galley carts 108 using insulating panels 200 selectively positioned in the cart compartments 102 to reduce thermal waste in the cart compartment 102.

The galley 100 defines one or more of the cart compartments 102, which are typically arranged below a counter or midwall 105 of the galley 100. The cart compartments 102 are closed by doors 107, which have seal assemblies 109 in various embodiments for sealing the cart compartments 102, such as at the floor and/or around the door frames. Each cart compartment 102 may hold any number of galley carts 108. The galleys 100 may be used for the storage and/or preparation of food or beverages. The galley 100 is positioned within a cabin 110 of the aircraft 106, and the cabin of the aircraft 106 is divided into a passenger area 112 and a galley area 114. The galley area 114 has a working area for the galley crew forward of the galley 100 where the cart compartments 102, midwall 105, and cabinets or storage bins may be accessed.

As used herein a "cart compartment" is an insulated volume that is utilized to store one or more galley carts 108 on the aircraft 106. A "galley cart", as used herein, is a portable device that is used to store food and/or beverages that are transported from a caterer to the aircraft 106 or from the cart compartments 102 to other parts of the aircraft 106 for serving the food and/or beverages. The galley carts 108 may include wheels, however some galley carts 108 may be hand carried boxes in some embodiments.

The galley 100 includes a cooling system 115 having a supply duct 117 and a return duct 118. The cooling system 115 also has one or more heat exchangers 116 that provide cooled air for the galley carts 108 in the cart compartment 102. The cooled air from the heat exchangers 116 flows into and out of the cart compartments 102 through the supply duct 117 and the return duct 118 of the cooling system 115. The supply duct 117 is configured to supply cooled airflow from the heat exchanger 116. The supply duct 117 and the return duct 118 are located in or along the rear wall of the galley 100 in various embodiments. The supply duct 117 and the return duct 118 are located in or along the midwall 105 in various embodiments. The supply duct 117 and the return duct 118 are located in or along one or more panels of the galley 100 in flow communication with the cart compartment 102 in various embodiments. The cart compartments 102 are thermally insulated to reduce cooling requirements demanded by the heat exchanger 116. As such, the heat exchanger 116 is operated less frequently to conserve energy and fuel on the aircraft 106. Additionally, providing additional thermal insulation in the cart compartments 102, as compared to conventional galleys, allows design and use of a smaller heat exchanger 116 compared to those typical for conventional galleys, which can lead to weight and cost savings. Using a smaller heat exchanger 116 and/or operating the heat exchanger 116 less frequently due to the improved thermal efficiency in the cart compartment creates less waste heat from the cooling system.

The galley 100 includes various walls 119 defining a bottom 120, a top 122, a front 124, a rear 126 opposite the front 124, and opposite sides 128, 130. The walls 119 include a floor 121 at the bottom 120, a top wall 123 at the top 122, a front wall 125 at the front 124, a rear wall 127 at the rear 126, a first side wall 129 at the first side 128, and a second side wall 131 at the second side 130. The midwall 105 extends between the side walls 129, 131 at a height approximately centered between the floor 121 and the top wall 123.

The cart compartment 102 is positioned below the midwall 105 and is defined by the midwall 105, the side walls 129, 131, the rear wall 127, and the floor 121 (and may be defined by one or more divider walls between the side walls 129, 131 rather than the first side wall 129 and/or the second side wall 131). The cart compartment 102 defines a cavity 132 configured to receive the galley carts 108. In an exemplary embodiment, the doors 107 are provided at the front 124 of the galley 100 to close the cart compartment 102. The doors 107 are received in door frames 134 and, in the illustrated embodiment, are hingedly coupled to the door frames 134. The doors 107 are used to secure the galley carts 108 in the cart compartment 102. The doors 107 are used to contain the cooled air in the cart compartment 102. The doors 107 may be insulated. In various embodiments, when the galley carts 108 are positioned in the cavity 132, a space 136 is defined about the galley cart 108, such as in front of the galley carts 108, behind the galley carts 108, above the galley carts 108, and the like to allow air to flow around the galley carts 108 in the space 136.

In an exemplary embodiment, the galley 100 includes a frame 140 and panels 142 coupled to and supported by the frame 140. The frame 140 and the panels 142 define the walls 119 of the galley 100. The frame 140 may be secured to the aircraft 106, such as to the floor 121, the walls 119, the crown, or other parts of the aircraft 106. In an exemplary embodiment, the frame 140 is a metal frame formed from a plurality of metal structural members 144 forming the general structure of the galley 100. The panels 142 are secured to the metal structural members 144 to form the walls 119 of the galley 100, such as using fasteners 166. The metal structural members 144 may be exposed at an exterior 138 of the galley 100 and/or an interior 139 of the cart compartment 102.

In an exemplary embodiment, the metal structural members 144 include posts 146 and rails 148. The posts 146 extend vertically, such as between the bottom 120 and the top 122 of the galley 100. The rails 148 extend horizontally, such as between the front 124 and the rear 126 of the galley 100 or between the sides 128, 130 of the galley 100. The rails 148 may extend between corresponding posts 146. The rails 148 may extend between other rails 148. The posts 146 may extend between corresponding rails 148. In an exemplary embodiment, the posts 146 are provided at corners 149 of the galley 100.

The metal structural members 144 may have any appropriate shape, such as C-shaped, T-shaped, I shaped, X-shaped, flat, and/or planar shaped, or any other suitable shape. In an exemplary embodiment, the metal structural members 144 are extruded metal structural members. However, the metal structural members 144 may be formed by other processes in alternative embodiments, such as stamping and forming, molding, die casting, and the like. The metal structural members 144 may include plates or panels extending from the posts 146 or the rails 148 to provide structural support for other components within the galley 100 other than the panels 142. For example, such plates may be used to support bumpers for the galley carts 108, to support guide rails for guiding the galley carts 108 into the cart compartments 102, to support the supply duct 117 and/or the return duct 118, or to support other components of the galley 100. In an exemplary embodiment, interior surfaces of at least one or more of the posts 146 and/or the rails 148 may be covered by at least one insulating panels 200 inside the cart compartment 102.

In an exemplary embodiment, the galley 100 includes insulating panels 200 inside the cart compartment 102. The insulating panels 200 provide thermal insulation for the cart compartment 102 in addition to any insulation provided by the panels 142. The insulating panels 200 cover portions of the metal structural members 144 to provide insulation for the metal structural members 144. The insulating panels 200 may cover portions of the panels 142. In an exemplary embodiment, the insulating panels 200 are removably coupled to the frame 140 and/or the panels 142. For example, the insulating panels 200 may be secured to the metal structural members 144 and/or the panels 142 using adhesive. Insulating panels 200 are removable such that the insulating panels 200 may be easily replaced if worn, damaged, or as needed over time.

Figure 3:
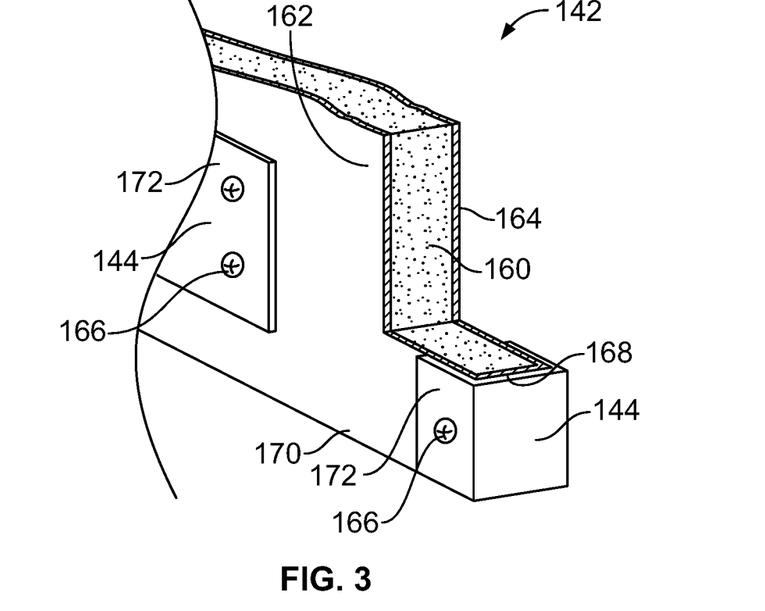
FIG. 3 is a cross-sectional view of a portion of the galley in accordance with an exemplary embodiment.

FIG. 3 is a cross-sectional view of a portion of the galley 100 showing one of the panels 142 and the frame 140 supporting the panel 142. The panel 142 includes a core 160, an inner facesheet 162, and an outer facesheet 164. In various embodiments, the core 160 may be a rigid foam material. In other various embodiments, the core 160 may be a honeycomb core having cell walls defining air pockets. The core 160 provides thermal insulation for the galley 100. The facesheets 162, 164 may be secured to the core 160 using adhesive, fasteners, clips, and the like.

In an exemplary embodiment, the panel 142 is secured to the corresponding metal structural members 144 of the frame 140 using fasteners 166. In the illustrated embodiment, the frame 140 includes a C-shaped metal structural member 144 at the front 124 that extends along an edge 168 of the panel 142. The fastener 166 passes through the panel 142 to secure the panel 142 to the metal structural member 144. In the illustrated embodiment, the frame 140 includes a plate-shaped metal structural member 144 secured to the inner facesheet 162 of the panel 142. Other metal structural members 144 may be secured to other parts of the panel 142.

The inner facesheet 162 has an inner surface 170 facing the cart compartment 102. In an exemplary embodiment, the metal structural members 144 are located interior of the inner surface 170. For example, the metal structural members 144 have one or more interior surfaces 172 located interior of the inner surface 170 of the inner facesheet 162. While the core 160 provides thermal insulation for the galley 100, the metal structural members 144 define thermal bridges between the interior of the cart compartment 102 and the exterior of the galley 100. For example, the metal material of the metal structural member 144 creates a thermally conductive path from the interior of the cart compartment 102 to the exterior of the galley 100. The fasteners 166 may also define thermal bridges that create thermal paths from the interior of the cart compartment 102 to the exterior of the galley 100. The thermal bridges reduce the efficiency of the galley 100 by dissipating the cool air to the exterior of the galley 100, thus warming the cart compartment 102. In an exemplary embodiment, the insulating panels 200 are used to insulate the exposed portions of the interior surfaces 172 of the metal structural members 144 and/or the fasteners 166 to reduce the effects of the thermal bridging and increase the thermal efficiency of the galley 100. For example, the insulating panels 200 may cover at least a portion of the interior surface 172 of the metal structural members 144. The insulating panels 200 may provide an additional insulating member along the panel 142 to enhance the insulating properties of the panel 142.

Figure 4:
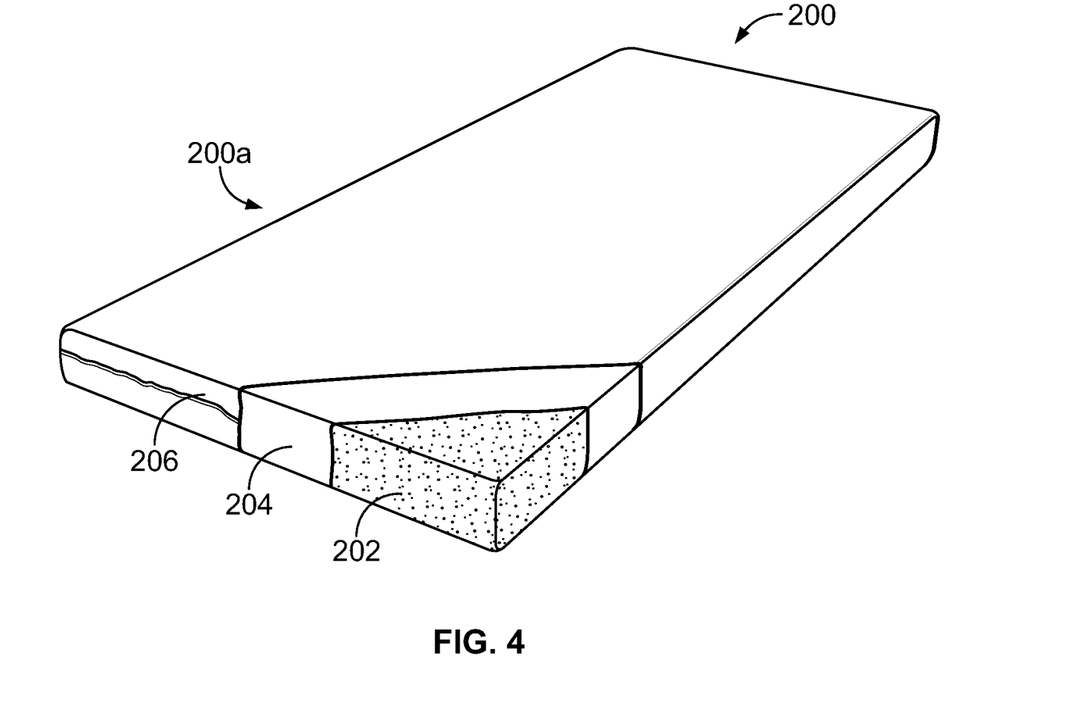
FIG. 4 is a partial sectional view of an insulating panel for the galley in accordance with an exemplary embodiment.

FIG. 4 is a partial sectional view of one of the insulating panels 200 in accordance with an exemplary embodiment. In an exemplary embodiment, the insulating panel 200 is a vacuum insulating panel 200a. The insulating panel 200 has an insulative core 202 manufactured from insulative material. In various embodiments, the insulating panel includes a cover 204 over the insulative core 202, such as a dust cover. In various embodiments, the insulating panel 200 includes a vacuum-sealed membrane wall 206 over the insulative core 202 and/or over the cover 204. The insulating panels 200 may be manufactured relatively thin compared to the panels 142 forming the walls of the galley 100. The insulating panels 200 may provide a higher thermal efficiency than the panels 142. The insulating panels 200 may be designed to be selectively placed within the cart compartment 102 to provide thermal insulation in select areas, such as along the metal structural members 144 of the frame 140.

The insulative core 202 may be a rigid core having a predetermined shape to define the shape of the insulating panel 200. The cover 204 and the vacuum-sealed membrane wall 206 may conform to the shape of the insulative core 202. In the illustrated embodiment, the insulating panel 200 is rectangular shaped; however, the insulating panel 200 may have other, more complex shapes in alternative embodiments. For example, the insulating panel 200 may include one or more curved edge walls and/or curved corners. The insulating panel 200 may include greater or fewer than four sides in alternative embodiments. The insulative core 200 may be a porous material, such as fumed silica, aerogel, perlite, or glass fiber. The insulative core 200 may be a foam core. The cover 204 is air permeable and is used to contain powder or other particles of the insulative core 202. The cover 204 may protect the insulative core 202 during handling or use. The membrane wall 206 is a film, such as a polyester film, impermeable to air and moisture. The membrane wall 206 is configured to be vacuum sealed, such as around the cover 204 when used, or directly to the insulative core 202 when the cover 204 is not used. The membrane wall 206 is vacuum sealed by removing air inside the membrane wall 206 to shrink the membrane wall to conform the membrane wall 206 around the insulative core 202 (or the cover 204). The membrane wall 206 is sealed after the air is removed to maintain the conformed shape.

Figure 5:
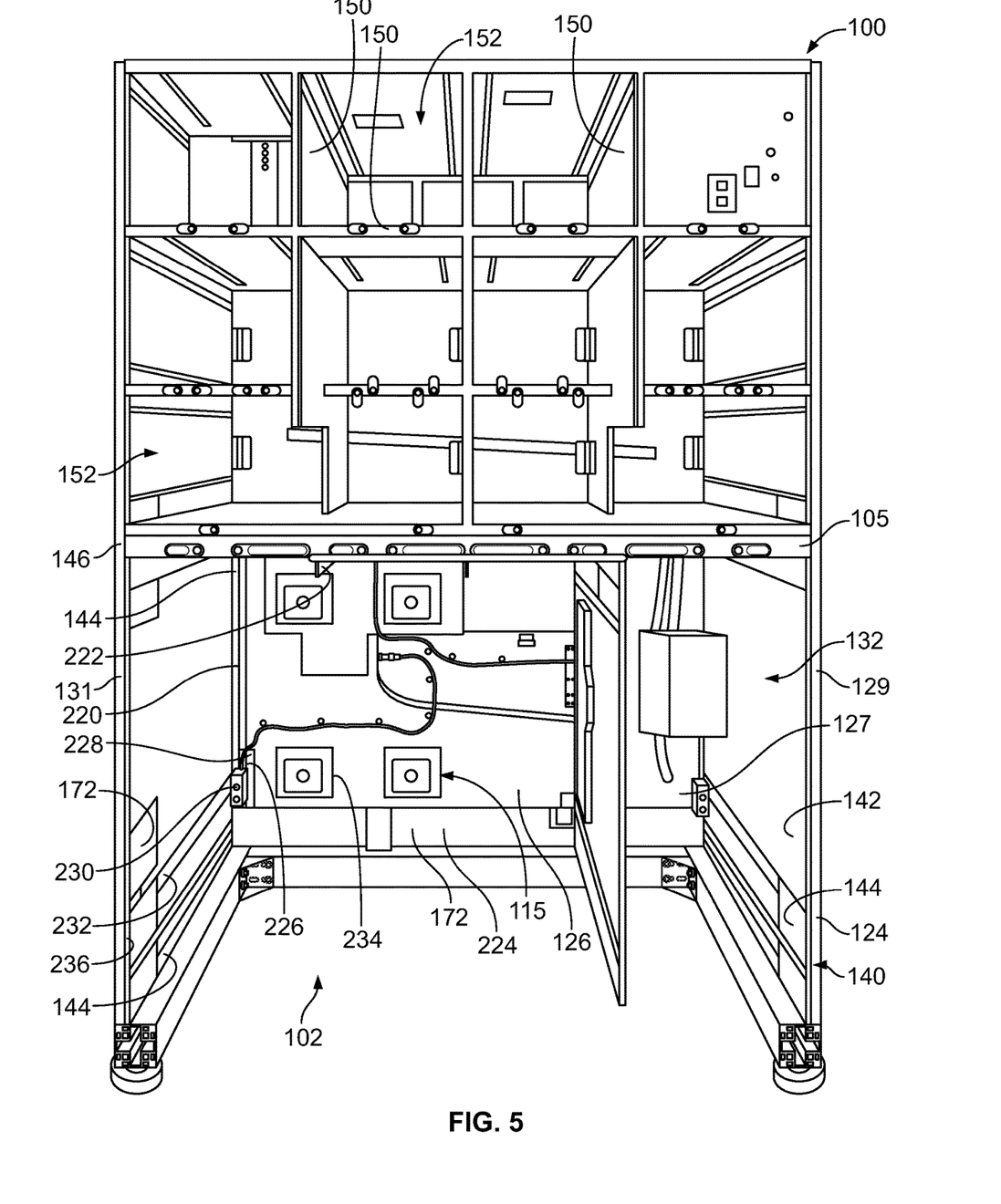
FIG. 5 is a front view of the galley in accordance with an exemplary embodiment.
Figure 6:
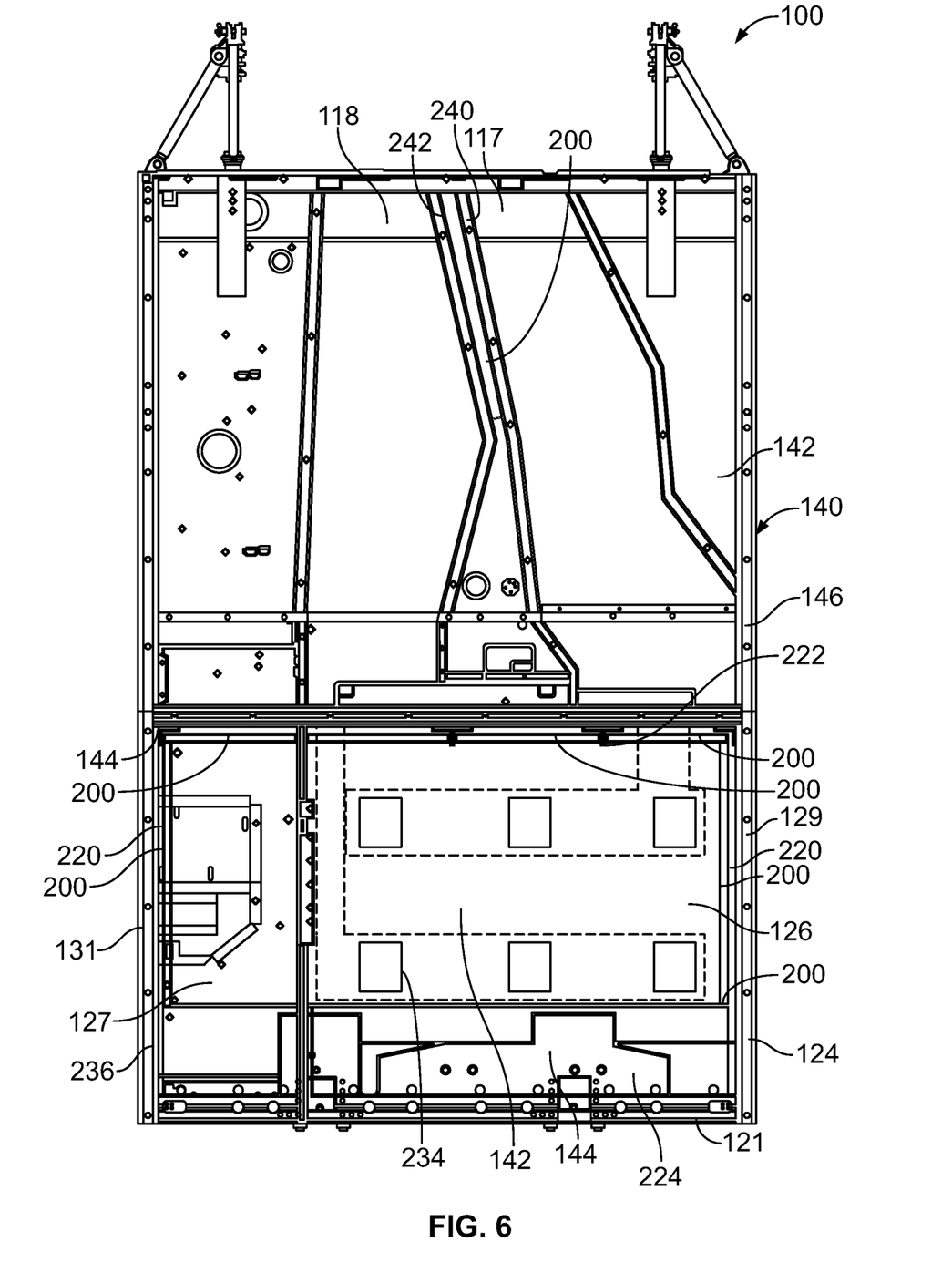
FIG. 6 is a front view of the galley in accordance with an exemplary embodiment.

FIG. 5 is a front view of the galley 100 in accordance with an exemplary embodiment showing the frame 140 and the panels 142 without the insulating panels 200. FIG. 6 is a front view of the galley 100 in accordance with an exemplary embodiment showing the frame 140 and the panels 142 with insulating panels 200 in select locations within the galley 100. FIG. 5 shows the galley 100 with upper walls 150 forming cabinets 152. FIG. 6 shows the galley 100 without the upper walls 150 and cabinets 152 to show the supply duct 117 and the return duct 118 of the cooling system 115.

As shown in FIG. 5, when the galley 100 is assembled, the metal structural members 144 of the frame 140 support the panels 142. Portions of the metal structural members 144 are exposed in the cavity 132 of the cart compartment 102, and thus may be exposed to the cold air supplied to the cart compartment 102 by the cooling system 115. The interior surfaces 172 of the metal structural members 144 define the exposed portions of the metal structural members 144. While the panels 142 may provide some insulation for the galley 100, the exposed, metal interior surfaces 172 provide thermal bridges through the galley 100, such as to the exterior of the galley 100, decreasing the thermal efficiency of the galley 100. As shown in FIG. 6, some or all of the interior surfaces 172 may be covered by the insulating panels 200 to increase the thermal efficiency of the galley 100.

The galley 100 includes various types of metal structural members 144 to form the frame 140. The different types of metal structural members 144 are provided at different locations and have different shapes and configurations. The insulating panels 200 may be pieced together to provide thermal insulation for some or all of the interior surfaces 172 of the various metal structural members 144.

In various embodiments, the metal structural members 144 include corner extrusions 220 defining the posts 146 at the rear 126 and/or the posts 146 at the front 124. The corner extrusions 220 have channels that receive the panels 142, such as edges of the panels 142. The corner extrusions 220 have interior surfaces 172.

In various embodiments, the metal structural members 144 include cart dividers 222 extending along the midwall 105 at the top of the cart compartment 102. The cart dividers 222 are used to guide the galley carts 108 into the cart compartment 102. The cart dividers 222 include interior surfaces 172. First and second insulating panels 200 are arranged parallel to each other with the cart divider 222 between the first and second insulating panels 200. The cart divider 222 extends into the cart compartment 102 interior of the first and second insulating panels 200 to divide the galley carts 108 from each other.

In various embodiments, the metal structural members 144 include one or more saddle brackets 224 located at the floor 121 of the cart compartment 102. Each saddle bracket 224 receives a corresponding panel 142. More specifically, the saddle brackets 224 have channels that receive the bottoms of the panels 142. The saddle brackets 224 may be secured to the floor joists below the floor 121 of the cabin 110 to secure the galley 100 to the aircraft 106. The saddle brackets 224 have interior surfaces 172. The insulating panel 200 covers the interior surface 172 of the saddle bracket 224.

In various embodiments, the metal structural members 144 include panel penetrations 226 used for supporting various components of the galley 100. The panel penetrations 226 have plates 228 that are mounted to the panel 142 and/or the frame 140. The plates 228 may define mounting brackets for mounting the other components to the galley 100. For example, in various embodiments, the galley 100 may include a cart bumpers 230 coupled to the corresponding panel penetration 226 at the rear wall 127. The galley 100 may include cart bumper rails 232 extending along the side walls 129, 131 coupled to corresponding panel penetrations 226.

In various embodiments, the metal structural members 144 include vents 234 at the supply port and the return port for the cooling system 115. In the illustrated embodiment, the vents 234 are provided at the rear wall 127. However, in alternative embodiments, the vents 234 may be provided at other locations, such as along the midwall 105. The vents 234 include interior surfaces 172.

In various embodiments, the metal structural members 144 include hinges 236 for the doors 107. The hinges 236 may be provided at the front 124, such as at the front of the side walls 129, 131. The hinges 236 may be part of the posts 146 at the front 124. The hinges 236 have interior surfaces 172.

As shown in FIG. 6, the interior surfaces 172 of the corner extrusions 220, the cart dividers 222, the saddle brackets 224, the panel penetrations 226, the vents 234, and/or the hinges 236 may be covered by corresponding insulating panels 200. In various embodiments, the insulating panels 200 may be selectively positioned in the cart compartment 102 to cover one or more targeted interior surfaces 172. In various embodiments, one insulating panel 200 may cover interior surfaces 172 of more than one metal structural member 144. In various embodiments, the insulating panels 200 may abut against each other. The insulating panels 200 may cover the fasteners 166 in addition to the interior surfaces 172. In various embodiments, there may be portions of the panels 142 and/or the metal structural members 144 that are uncovered, such as due to the shape or difficulty in fitting the insulating panels 200 in some areas of the cart compartment 102. However, having at least a majority of the interior surfaces 172 covered greatly enhances the thermal efficiency of the galley 100. The insulating panels 200 may provide additional insulation for the panels 142 enhancing the thermal efficiency along areas of the walls of the galley 100 that are devoid of the metal structural members 144.

As shown in FIG. 6, at least one insulating panel 200 is positioned between the supply duct 117 and the return duct 118 in an exemplary embodiment. The insulating panel 200 provides a thermal barrier between a wall 240 of the supply duct 117 and a wall 242 of the return duct 118. Because the wall 240 is relatively cooler and the wall 242 is relatively warmer, the insulating panel 200 separates the walls 240, 242. Without the insulating panel 200, the wall of the supply duct 117 would be exposed to the warmer wall 240 of the return duct 118, which would lead to thermal transfer between the walls 240, 242. The thermal bridging therebetween would raise the temperature of the supply air in the supply duct 117 and cause the cooling system 115 to work harder to maintain the cool temperature in the cart compartment 102. The insulating panels 200 provide thermal insulation for the walls 240, 242. Optionally, the supply duct 117 and/or the return duct 118 may be lined along the exterior and/or the interior with insulating panels 200.

Figure 7:
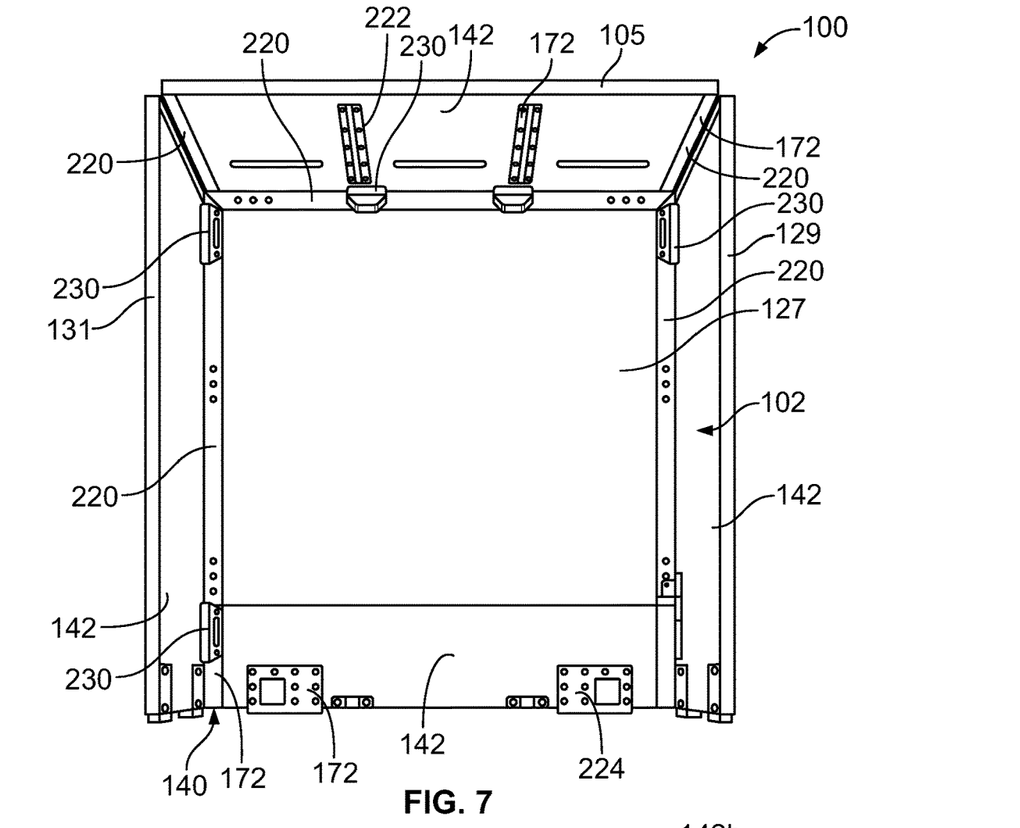
FIG. 7 is a perspective view of a portion of the galley in accordance with an exemplary embodiment.

FIG. 7 is a perspective view of a portion of the galley 100 showing the cart compartment 102, including various members of the frame 140 and the corresponding panels 142. FIG. 7 shows corner extrusions 220 in the rear corners of the galley 100 at the intersection between the rear wall 127 and the side walls 129, 131. FIG. 7 shows a corner extrusion 220 in the upper corner of the cart compartment 102 at the intersection between the rear wall 127 and the midwall 105. FIG. 7 shows corner extrusions 220 in the upper corners of the cart compartment 102 at the intersection between the midwall 105 and the side walls 129, 131. FIG. 7 shows cart dividers 222 along the midwall 105. FIG. 7 shows cart bumpers 230 along the rear wall 127. FIG. 7 shows saddle brackets 224 along the rear wall 127 and the side walls 129, 131. In an exemplary embodiment, the interior surfaces 172 of the corner extrusions 220, the cart dividers 222, the cart bumpers 230, and the saddle brackets 224 may be covered by insulating panels 200 (shown in FIG. 4).

Figure 8:
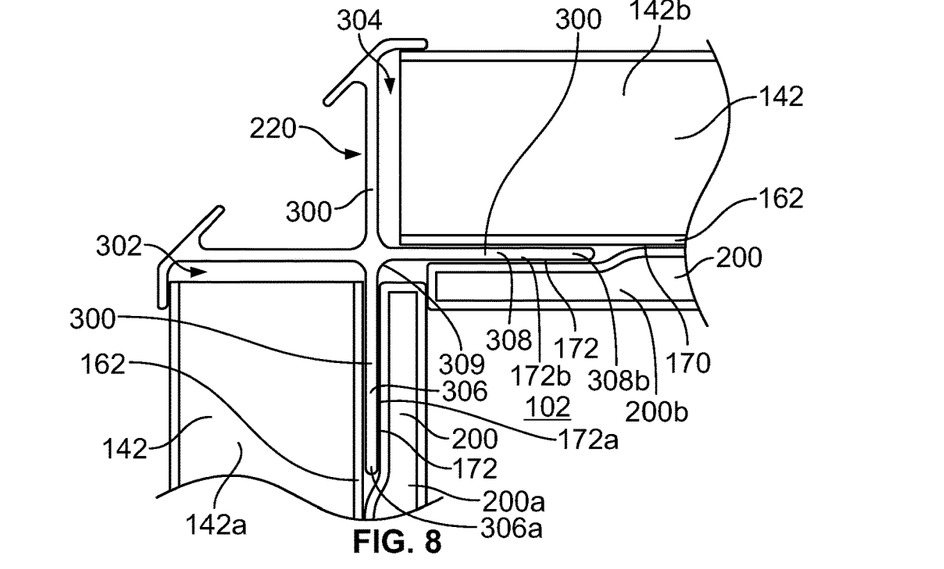
FIG. 8 is a cross-sectional view of a portion of the galley in accordance with an exemplary embodiment.

FIG. 8 is a cross-sectional view of a portion of the galley 100 showing the corner extrusion 220 holding the panels 142 and insulating panels 200 insulating the interior surfaces 172 of the corner extrusion 220 and the panels 142. The corner extrusion 220 includes beams 300 having an X-shape. The beams 300 form a first channel 302 and a second channel 304. The first channel 302 receives a corresponding panel 142 and the second channel 304 receives a corresponding panel 142. The beams 300 define a first wall support 306 and a second wall support 308 that face the cart compartment 102 and define the interior surfaces 172 of the corner extrusion 220. For example, the first wall support 306 may be a side wall support, a rear wall support, a midwall support, and the like depending on the location of the corner extrusion 220 within the galley 100 and the particular wall panels that are supported by the corner extrusion 220. The second wall support 308 may be a side wall support, a rear wall support, a midwall support, and the like depending on the location of the corner extrusion 220 within the galley 100 and the particular wall panels that are supported by the corner extrusion 220. The first wall support 306 and the second wall support 308 meet at an interior corner 309. The interior surfaces 172 are interior of the inner surface 170 of the inner facesheet 162 of the panel 142.

In various embodiments, the insulating panels 200 directly engage the beams 300. Optionally, the insulating panels 200 may directly engage the inner surface 170 of the panel 142. The insulating panels 200 abut against each other to limit air leakage between the insulating panels 200. For example, a first insulating panel 200a and a second insulating panel 200b may be oriented perpendicular to each other in the corner 309 and abut against each other at the corner extrusion 220. In alternative embodiments, a single insulating panel 200 is provided having a right angle that fits into the corner extrusion 220. Without the insulating panel 200, the interior surface 172 would be exposed to the cooled air of the cart compartment 102. The beams 300 would define thermal bridges that would transfer the lower-temperature to the exterior of the galley 100. Such thermal transfer would increase the temperature in the cart compartment 102 and/or cause the cooling system 115 to work harder to maintain the cool temperature in the cart compartment 102. The insulating panels 200 provide thermal insulation for the interior surfaces 172. The insulating panels 200 reduce the warming effect of the exposed metal beams 300 in the cart compartment 102 common in conventional galleys.

In an exemplary embodiment, the corner extrusion 220 supports a side panel 142a of the panels 142 and a rear panel 142b of the panels 142. The first wall support 306 is a side wall support 306a and the second wall support 308 is a rear wall support 308b meeting at the interior corner 309 of the corner extrusion 220. The side wall support 306a supports the side panel 142a and the rear wall support 308b supports the rear panel 142b. The side wall support 306a and the rear wall support 308b define interior surfaces 172a, 172b, respectively, of the corner extrusion 220. The insulating panels 200 cover the side wall support 306a and the rear wall support 308b.

Figure 9:
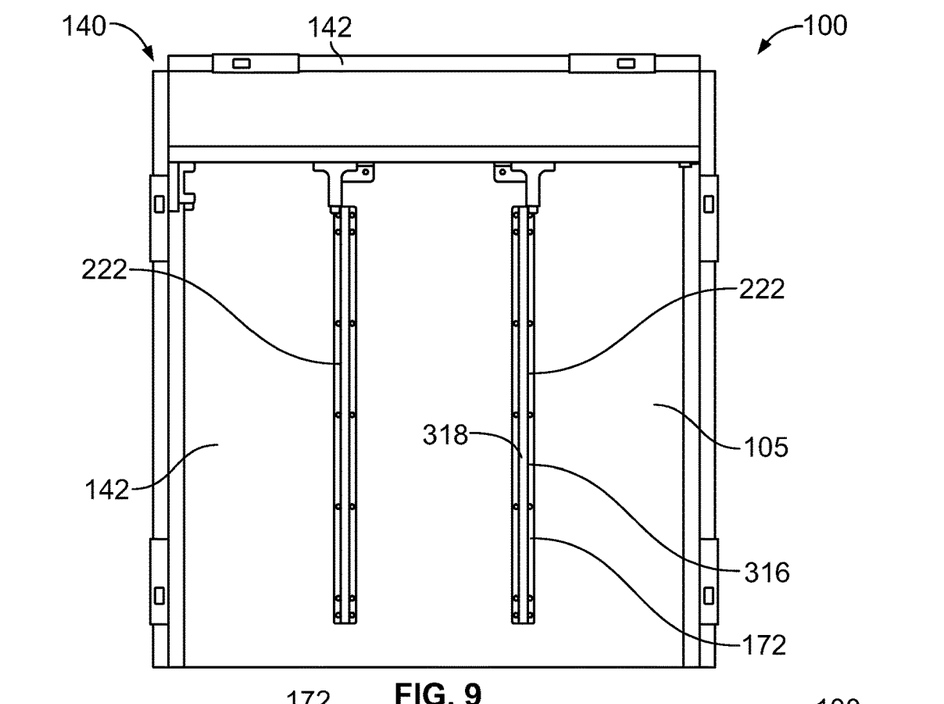
FIG. 9 is a bottom view of a portion of the galley in accordance with an exemplary embodiment.
Figure 10:
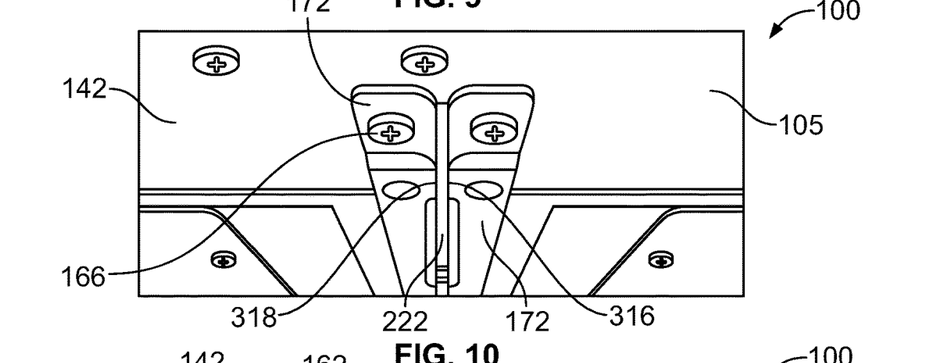
FIG. 10 is a bottom perspective view of a portion of the galley in accordance with an exemplary embodiment.

FIG. 9 is a bottom view of a portion of the galley 100 showing the midwall 105, including various members of the frame 140 and the corresponding panels 142. FIG. 10 is a bottom perspective view of a portion of the galley 100 showing the midwall 105. FIGS. 9 and 10 show cart dividers 222 along the midwall 105. In an exemplary embodiment, the interior surfaces 172 of the cart dividers 222 may be covered by insulating panels 200 (shown in FIG. 4).

Figure 11:
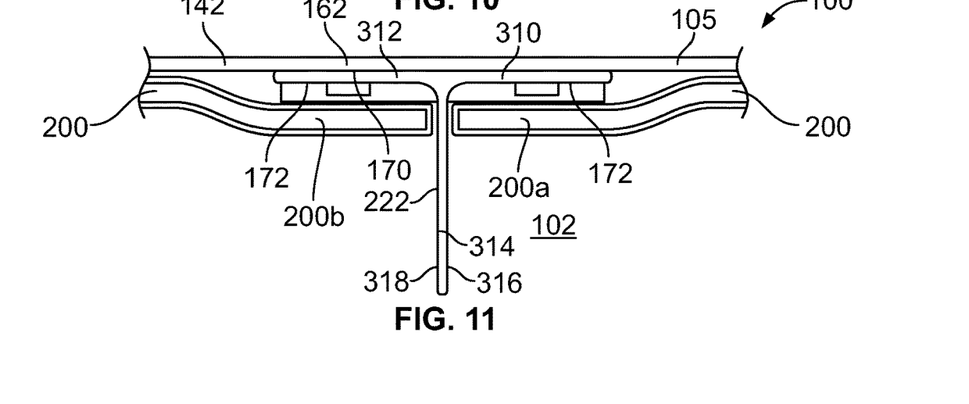
FIG. 11 is a cross-sectional view of a portion of the galley in accordance with an exemplary embodiment.

FIG. 11 is a cross-sectional view of a portion of the galley 100 showing the cart divider 222 along the panel 142 defining the midwall 105 and insulating panels 200 insulating the interior surfaces 172 of the cart divider 222 and the panel 142. The cart divider 222 includes beams 310 having a T-shape. The beams 310 include a base beam 312 and a divider beam 314 extending from the base beam 312. The divider beam 314 is used to locate the galley cart 108 in the cart compartment 102. For example, the cart divider 222 extends into the cart compartment 102 interior of the insulating panels 200 to divide the galley carts from each other. The divider beam 314 is positioned between adjacent galley carts 108 to separate the galley carts 108. The base beam 312 is coupled to the panel 142. The base beam 312 defines the interior surfaces 172 along the inner surface 170 of the inner facesheet 162 of the panel 142. The cart divider 222 has a first side 316 and a second side 318.

Insulating panels 200 are provided on both the first side 316 and the second side 318 of the divider beam 314 of the cart divider 222. In an exemplary embodiment, separate insulating panels 200 are used on opposite sides of the divider beam 314. For example, the insulating panels 200 may include a first insulating panel 200a and a second insulating panel 200b arranged parallel to each other with the cart divider 222 between the first insulating panel 200a and the second insulating panel 200b. For example, the first insulating panel 200a is provided on the first side 316 of the cart divider 222 and a second insulating panel 200b is provided on the second side 318 of the cart divider 222. In alternative embodiments, a single insulating panel 200 may be used having a slot that receives the divider beam 314. In various embodiments, the insulating panels 200 directly engage the base beam 312 and/or the divider beam 314. Optionally, the insulating panels 200 may directly engage the inner surface 170 of the panel 142. Without the insulating panels 200, the interior surfaces 172 would be exposed to the cooled air of the cart compartment 102. The insulating panels 200 cover the base beam 312 and the fasteners 166. Otherwise, the base beam 312 would define a thermal bridge. The fasteners 166 would define thermal bridges through the panel 142. The thermal bridging would increase the temperature in the cart compartment 102 and/or cause the cooling system 115 to work harder to maintain the cool temperature in the cart compartment 102. The insulating panels 200 provide thermal insulation for the interior surfaces 172. The insulating panels 200 reduce the warming effect of the exposed metal beams 310 in the cart compartment 102 common in conventional galleys.

Figure 12:
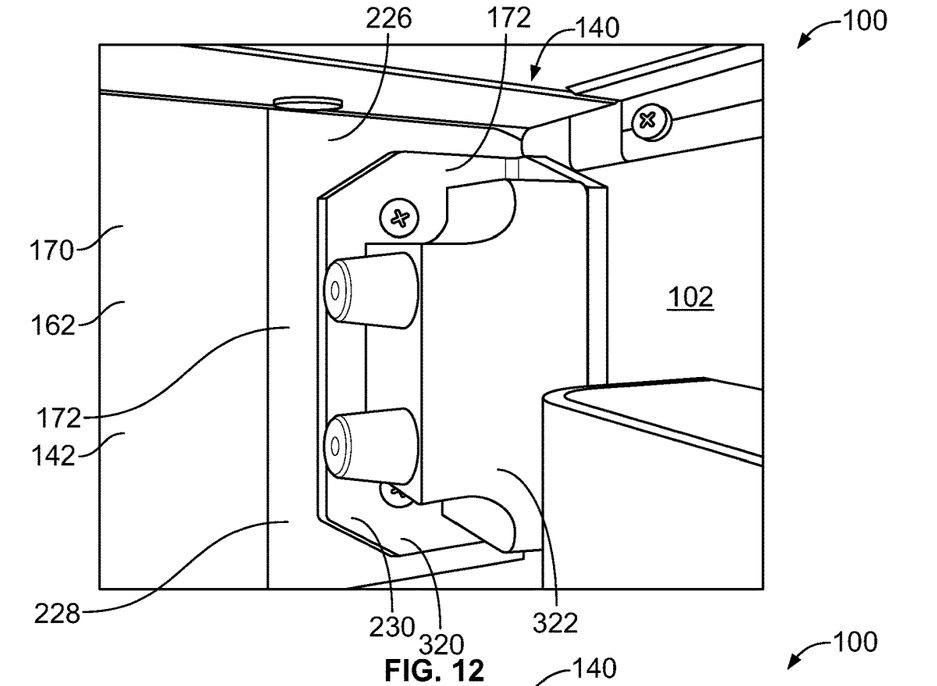
FIG. 12 is a perspective view of a portion of the galley in accordance with an exemplary embodiment.
Figure 13:
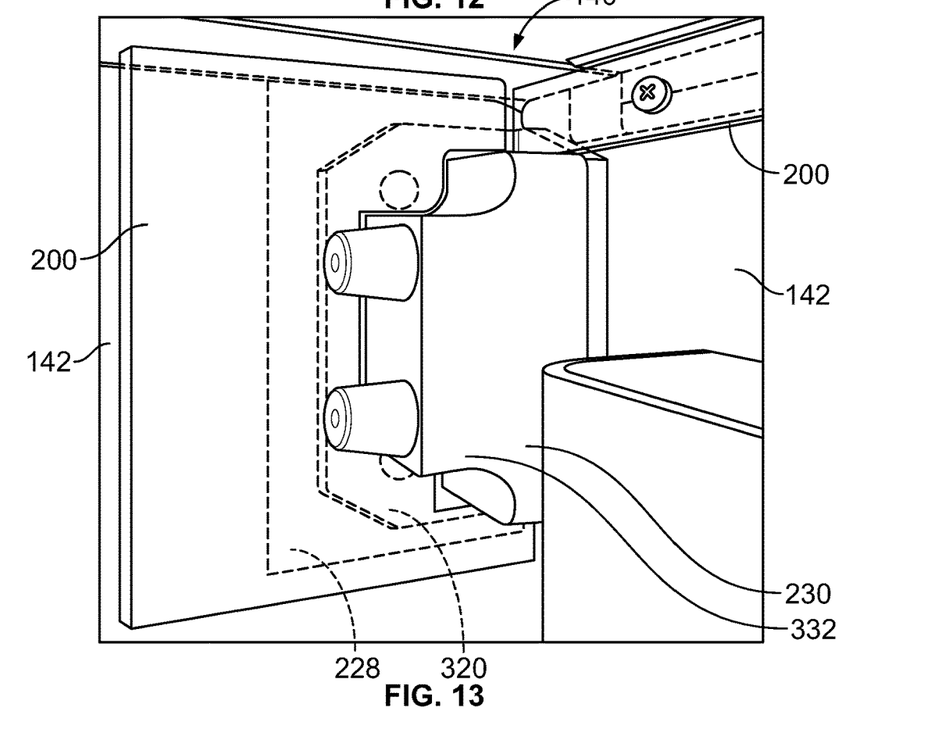
FIG. 13 is a perspective view of a portion of the galley in accordance with an exemplary embodiment.

FIG. 12 is a perspective view of a portion of the galley 100 with the insulating panels 200 removed to illustrate various members of the frame 140 and the corresponding panels 142. FIG. 13 is a perspective view of a portion of the galley showing the insulating panels 200. FIGS. 12 and 13 show a panel penetration 226 including a plate 228 for the cart bumper 230. In an exemplary embodiment, the interior surfaces 172 of the panel penetration 226 may be covered by insulating panels 200 (FIG. 13).

The plate 228 defines a mounting bracket 324 the cart bumper 230. The panel penetration 226 may extend into or through the panel 142, such as to couple to a portion of the frame 140 to provide structural support for the plate 228.

The cart bumper 230 includes a bumper member 322 extending from the mounting bracket 320. The bumper member 322 is used to stop and position the galley cart 108 in the cart compartment 102. For example, the bumper member 322 may include a rubber stopper configured to engage the galley cart 108 and position the galley cart 108 in the cart compartment 102. The plate 228 defines the interior surfaces 172 along the inner surface 170 of the inner facesheet 162 of the panel 142. The cart bumper 230 has one or more metal structural members forming the mounting bracket 324 for mounting the cart bumper 230 to at least one of the corresponding panel 142 and the corresponding metal structural member of the frame 140.

At least one insulating panel 200 is provided to cover the mounting bracket 320. For example, at least one insulating panel 200 is provided to cover the portions or all of the plate 228. In an exemplary embodiment, separate insulating panels 200 are pieced together around the bumper member 322 to fill the spaces around the bumper member 322 along the plate 228 and/or the mounting bracket 320. In alternative embodiments, a single insulating panel 200 may be used having a shape that is complementary to the shape of the bumper member 322 to cover a substantial portion of the plate 228 and/or the mounting bracket 320. In various embodiments, the insulating panels 200 directly engage the bumper member 322. Without the insulating panels 200, the interior surfaces 172 would be exposed to the cooled air of the cart compartment 102 and define a thermal bridge. The thermal bridging would increase the temperature in the cart compartment 102 and/or cause the cooling system 115 to work harder to maintain the cool temperature in the cart compartment 102. The insulating panels 200 provide thermal insulation for the interior surfaces 172. The insulating panels 200 reduce the warming effect of the exposed metal in the cart compartment 102 common in conventional galleys.

Figure 14:
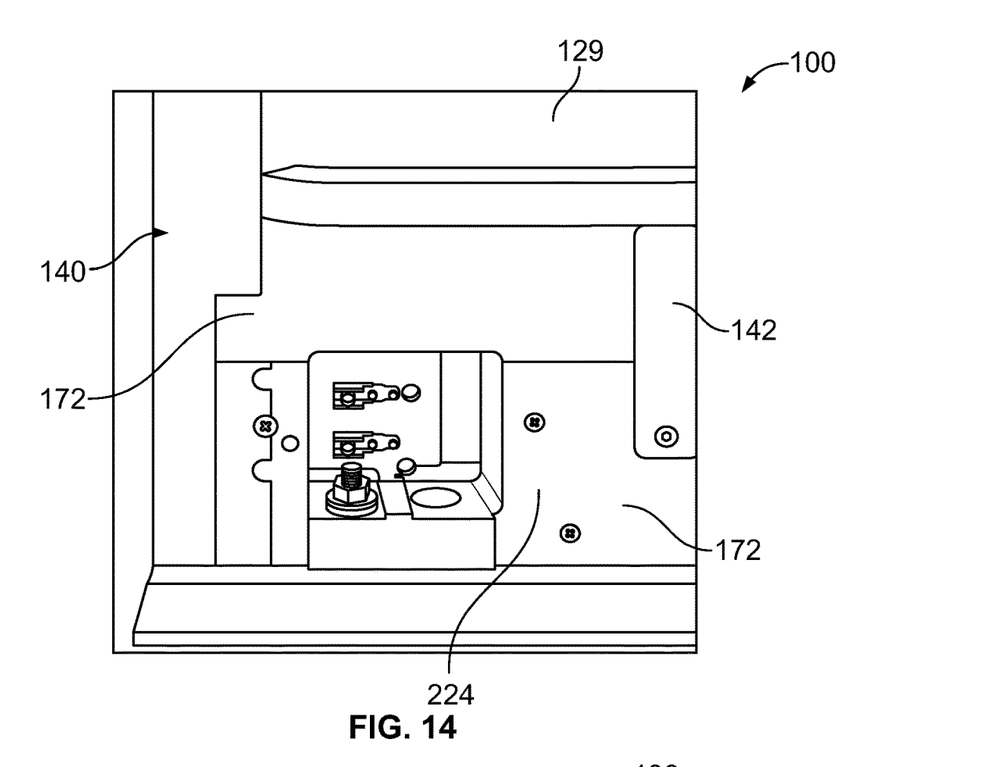
FIG. 14 is a bottom perspective view of a portion of the galley in accordance with an exemplary embodiment.

FIG. 14 is a bottom perspective view of a portion of the galley 100 showing the side wall 129, including various members of the frame 140 and the corresponding panel 142. FIG. 14 shows the saddle bracket 224 and a mounting bracket associated with the saddle bracket 224. In an exemplary embodiment, the interior surfaces 172 of the saddle bracket 224 may be covered by insulating panels 200 (shown in FIG. 4).

Figure 15:
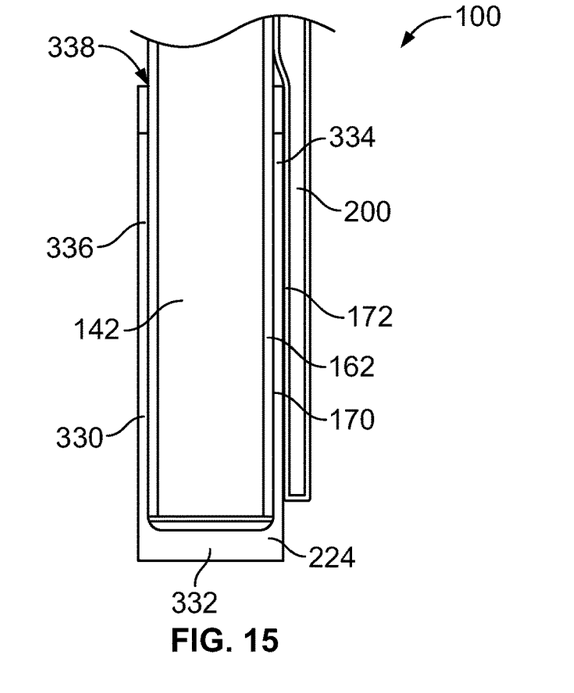
FIG. 15 is a cross-sectional view of a portion of the galley in accordance with an exemplary embodiment.

FIG. 15 is a cross-sectional view of a portion of the galley 100 showing the saddle bracket 224 receiving the corresponding panel 142 and the insulating panel 200 covering the interior surfaces 172 of the saddle bracket 224 and the panel 142. The saddle bracket 224 includes walls 330 having a C-shape. The walls 330 include a base wall 332 and side walls 334, 336 extending from the base wall 332. The base wall 332 may be secured to the floor 121 or floor joist to secure the galley 100 in the aircraft 106. The side walls 334, 336 form a channel 338 that receives the panel 142. The side wall 334 faces the cart compartment 102 and defines the interior surface 172 of the saddle bracket 224. The side wall 334 extends along the inner surface 170 of the inner facesheet 162 of the panel 142.

The insulating panel 200 is coupled to the side wall 334. Optionally, the insulating panel 200 may be coupled to the inner surface 170 of the panel 142 above the side wall 334. Without the insulating panel 200, the interior surface 172 would be exposed to the cooled air of the cart compartment 102. The walls 330 would define a thermal bridge. The thermal bridging would increase the temperature in the cart compartment 102 and/or cause the cooling system 115 to work harder to maintain the cool temperature in the cart compartment 102. The insulating panel 200 provides thermal insulation for the interior surface 172. The insulating panel 200 reduces the warming effect of the exposed metal in the cart compartment 102 common in conventional galleys.

Figures 16, 17:
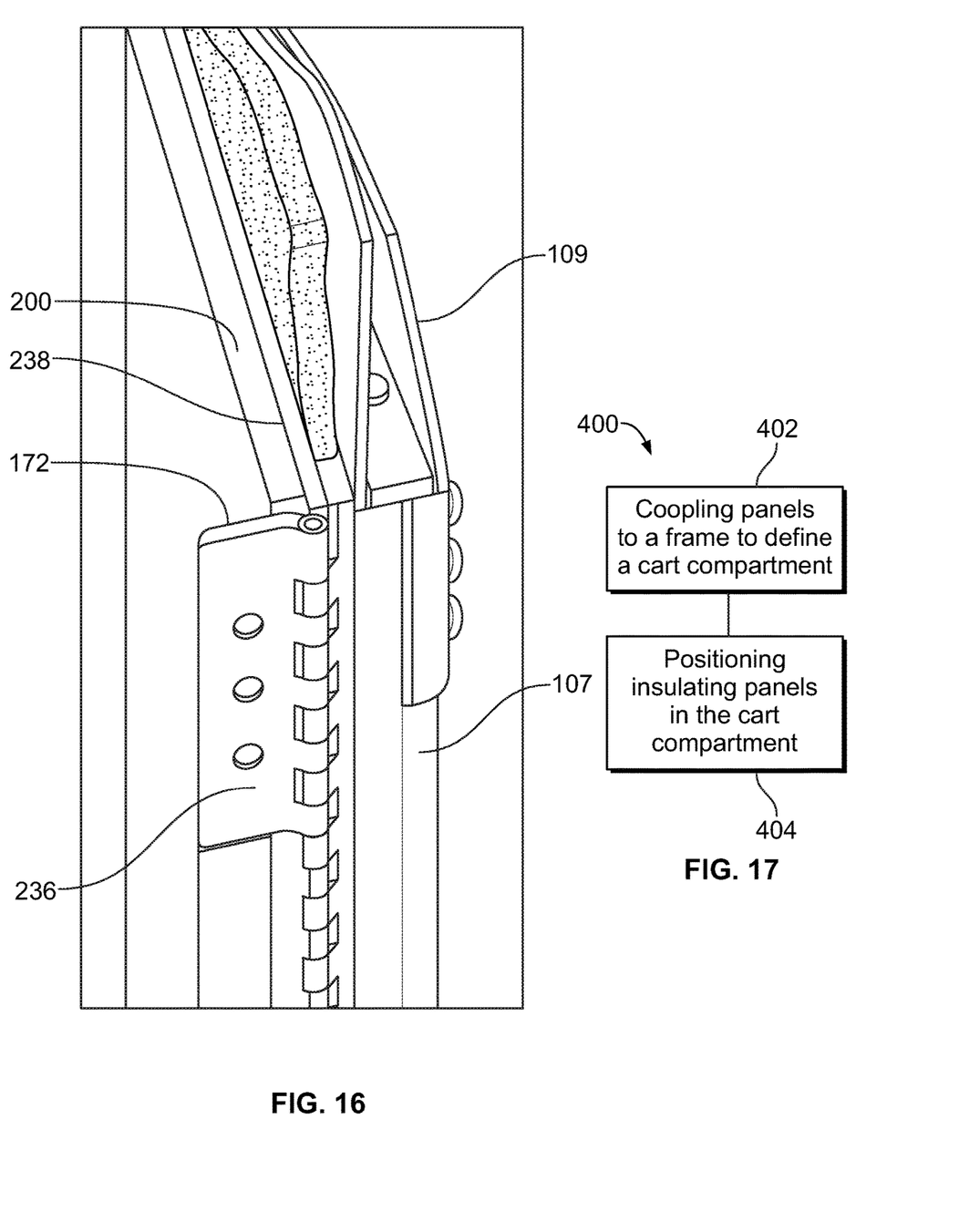
FIG. 16 is a bottom perspective view of a door for the galley in accordance with an exemplary embodiment.
FIG. 17 is a flow chart of a method of assembling a galley.

FIG. 16 is a bottom perspective view of the door 107 and the seal assembly 109 for the galley 100. The hinge 236 is coupled to the door 107. The hinge 236 defines interior surfaces 172 and the metal frame of the door 107 defines interior surfaces 172 that may cause thermal bridging. In an exemplary embodiment, the door 107 has one of the insulating panels 200 coupled thereto. For example, at least one insulating panel 200 may be coupled to an interior surface 238 of the door 107. The insulating panel 200 may cover the metal frame of the door 107 and/or the hinge 236 to provide thermal insulation for the door 107 and/or the hinge 236. Without the insulating panel 200, the interior surfaces 172 would be exposed to the cooled air of the cart compartment 102. Thermal bridging would increase the temperature in the cart compartment 102 and/or cause the cooling system 115 to work harder to maintain the cool temperature in the cart compartment 102. The insulating panel 200 provides thermal insulation for the interior surfaces 172. The insulating panel 200 reduces the warming effect of the exposed metal in the cart compartment 102 common in conventional galleys.

FIG. 17 is a flow chart of a method 400 of assembling a galley 100 having a frame 140 having metal structural members 144 with interior surfaces 172. The method 400 includes coupling 402 panels 142 to the frame 140 each having a core 160 and a facesheet 162 including an inner surface 170 to define a cart compartment 102 configured to receive a galley cart 108, wherein the interior surface 172 of the metal structural members 144 are interior of the inner surface 170 of the corresponding facesheet 162.

The method 400 includes positioning 404 insulating panels 200 in the cart compartment 102 to cover the interior surfaces 172 of the corresponding metal structural members 144. In various embodiments, the method 400 includes removably coupling the insulating panels 200 to at least one of the metal structural members 144 and the panels 142. In various embodiments, the method 400 includes covering at least 50% of a surface area of the panels 142 and covering at least 50% of a surface area of the interior surfaces 172. In various embodiments, the method 400 includes abutting insulating panels 200 in a corner 119 of the cart compartment 102. In various embodiments, the method 400 includes positioning a first insulating panel 200a of the insulating panels 200 along a first side 316 of a cart divider 222 and positioning a second insulating panel 200b of the insulating panels 200 along a second side 318 of the cart divider 222. In various embodiments, the method 400 includes positioning the insulating panels 200 to cover fasteners 166.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley for an aircraft comprising:
a frame having metal structural members, the metal structural members having interior surfaces;
panels coupled to and supported by the frame, each panel having a facesheet and a core, the facesheet having an inner surface, wherein the frame and the panels define a cart compartment configured to receive a galley cart, the interior surfaces of the metal structural members being interior of the inner surface of the corresponding facesheet;
a cooling system having a supply duct and a return duct along one or more of the panels in flow communication with the cart compartment, the supply duct configured to supply cooled airflow from a heat exchanger; and
insulating panels located in the cart compartment covering the interior surfaces of the corresponding metal structural members, the insulating panels defining interior surfaces of the galley facing the cart compartment.

2. The galley of claim 1, wherein the insulating panels cover a majority of the interior surfaces of the metal structural members of the frame.

3. The galley of claim 1, wherein the insulating panels fully cover the interior surfaces of the corresponding metal structural members.

4. The galley of claim 1, wherein the insulating panels cover at least 50% of a surface area of the metal structural members within the cart compartment.

5. The galley of claim 1, wherein each insulating panel is a vacuum insulating panel having an insulative core and a vacuum-sealed membrane wall surrounding the insulative core.

6. The galley of claim 1, wherein the insulating panels include a first insulating panel and a second insulating panel arranged parallel to each other with a cart divider between the first insulating panel and the second insulating panel, the cart divider extending into the cart compartment interior of the first insulating panel and the second insulating panel to divide the galley cart from a second galley cart.

7. The galley of claim 1, wherein the frame includes fasteners securing the panels to the corresponding metal structure members, the insulating panels covering corresponding fasteners.

8. The galley of claim 1, wherein the insulating panels are removably coupled to at least one of the corresponding panel and the corresponding metal structural member.

9. The galley of claim 1, wherein the insulating panels include at least one insulating panel between the supply duct and the return duct.

10. The galley of claim 1, wherein the metal structural members include posts and rails extending between corresponding posts, the insulating panels including at least one insulating panel covering interior surfaces of at least one post and at least one rail.

11. The galley of claim 1, wherein the metal structural members include a saddle bracket receiving the corresponding panel and located at a floor of the cart compartment, the insulating panels including at least one insulating panel covering the interior surface of the saddle bracket.

12. The galley of claim 1, further comprising a cart bumper having a metal structural member forming a mounting bracket for mounting the cart bumper to at least one of the corresponding panel and the corresponding metal structural member of the frame, the cart bumper having a bumper member extending from the mounting bracket, the insulating panels including at least one insulating panel covering the mounting bracket of the cart bumper.

13. The galley of claim 1, further comprising a cart divider having a metal structural member forming a base beam for mounting the cart divider to at least one of the corresponding panel and the corresponding metal structural member of the frame along a top of the cart compartment, the cart divider having a divider beam extending from the base beam used to position the galley cart in the cart compartment, the insulating panels including at least one insulating panel covering the base beam.

14. The galley of claim 1, further comprising a door hinge at a front of the cart compartment, the insulating panels including at least one insulating panel covering the door hinge.

15. The galley of claim 1, wherein the metal structural members of the frame include a corner extrusion forming a corner of the cart compartment supporting a side panel of the panels and a rear panel of the panels, the corner extrusion including a side wall support and a rear wall support meeting at an interior corner of the corner extrusion, the side wall support and the rear wall support defining interior surfaces of the corner extrusion, the insulating panels covering the side wall support and the rear wall support.

16. The galley of claim 1, further comprising a door coupled to the frame at a front of the cart compartment, the insulating panels include at least one insulating panel coupled to an interior surface of the door.

17. The galley of claim 1, wherein the insulating panels include a first insulating panel and a second insulating panel abutting against the first insulating panel.

18. The galley of claim 17, wherein the first insulating panel and the second insulating panel are oriented perpendicular to each other in a corner of the cart compartment.

19. A galley for an aircraft comprising:
a frame having metal structural members, the metal structural members having interior surfaces;
panels coupled to and supported by the frame, each panel having a facesheet and a core, the facesheet having an inner surface, wherein the frame and the panels define a cart compartment configured to receive a galley cart and configured to be cooled by a cooling system, the interior surfaces of the of the metal structural members being interior of the inner surface of the corresponding facesheet; and
insulating panels located in the cart compartment covering a majority of the interior surfaces of the metal structural members, the insulating panels defining interior surfaces of the galley facing the cart compartment.

20. A method of assembling a galley including a frame having metal structural members including interior surfaces, the method comprising:

coupling panels to the frame, wherein each panels has a core and a facesheet including an inner surface to define a cart compartment configured to receive a galley cart, wherein the interior surface of the metal structural members are interior of the inner surface of the corresponding facesheet; and positioning insulating panels in the cart compartment to cover the interior surfaces of the corresponding metal structural members to define interior surfaces of the galley facing the cart compartment.

21. The method of claim 20, wherein said positioning insulating panels in the cart compartment comprises removably coupling the insulating panels to at least one of the metal structural members and the panels.

22. The method of claim 20, wherein said positioning insulating panels in the cart compartment comprises covering at least 50% of a surface area of the panels and covering at least 50% of a surface area of the interior surfaces.

23. The method of claim 20, wherein said positioning insulating panels in the cart compartment comprises abutting the insulating panels in a corner of the cart compartment.

24. The method of claim 20, wherein said positioning insulating panels in the cart compartment comprises positioning at least one insulating panel of the insulating panels along a first side of a cart divider and positioning at least one insulating panel of the insulating panels along a second side of the cart divider.

25. The method of claim 20, wherein said coupling panels to the frame comprises coupling the panels to the frame using fasteners, and said positioning insulating panels in the cart compartment comprises covering the fasteners.

\* \* \* \* \*